United States Patent
Zhou et al.

(10) Patent No.: US 11,784,734 B2
(45) Date of Patent: Oct. 10, 2023

(54) METHOD AND APPARATUS FOR MULTI-PATH DELAY ESTIMATION

(71) Applicant: Telefonaktiebolaget LM Ericsson (publ), Stockholm (SE)

(72) Inventors: Wei Zhou, Beijing (CN); Peng Li, Beijing (CN); Luanxia Yang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 223 days.

(21) Appl. No.: 17/420,112

(22) PCT Filed: Jan. 14, 2020

(86) PCT No.: PCT/CN2020/072060
§ 371 (c)(1),
(2) Date: Jun. 30, 2021

(87) PCT Pub. No.: WO2020/147726
PCT Pub. Date: Jul. 23, 2020

(65) Prior Publication Data
US 2022/0060267 A1    Feb. 24, 2022

(30) Foreign Application Priority Data
Jan. 14, 2019 (WO) .............. PCT/CN2019/071601

(51) Int. Cl.
*H04B 17/364* (2015.01)
*H04L 25/02* (2006.01)

(52) U.S. Cl.
CPC ....... *H04B 17/364* (2015.01); *H04L 25/0224* (2013.01)

(58) Field of Classification Search
CPC .................... H04B 17/364; H04L 25/0224
See application file for complete search history.

(56) References Cited

U.S. PATENT DOCUMENTS

| 8,379,745 B1* | 2/2013 | Nabar ............... H04B 7/0456 |
| | | 375/267 |
| 2003/0012308 A1* | 1/2003 | Sampath ............ H04L 27/2647 |
| | | 375/340 |

(Continued)

FOREIGN PATENT DOCUMENTS

| CN | 103001676 A | 3/2013 |
| CN | 103888403 A | 6/2014 |

(Continued)

OTHER PUBLICATIONS

International Search Report and Written Opinion of the International Searching Authority, PCT/CN2020/072060, dated Apr. 7, 2020, 11 pages.

(Continued)

*Primary Examiner* — Zhiren Qin
(74) *Attorney, Agent, or Firm* — SAGE PATENT GROUP

(57) ABSTRACT

Embodiments of the present disclosure provide a method performed by a communication device. The method includes obtaining, in frequency domain, channel estimation for a transmission unit for a channel between the communication device and another communication device, and calculating correlation coefficients for the transmission unit based on the channel estimation. The method also includes obtaining a delay spread for the channel from the calculated correlation coefficients.

13 Claims, 3 Drawing Sheets

(56) References Cited

U.S. PATENT DOCUMENTS

| | | | |
|---|---|---|---|
| 2005/0152387 A1* | 7/2005 | Utsunomiya | H04L 25/0226 370/431 |
| 2005/0159120 A1* | 7/2005 | Garg | H04B 1/7115 455/132 |
| 2008/0212666 A1 | 9/2008 | Kuchi et al. | |
| 2011/0261675 A1* | 10/2011 | Lee | H04L 25/0204 370/310 |
| 2015/0112232 A1* | 4/2015 | Quatieri | A61B 5/7264 600/595 |
| 2017/0343968 A1* | 11/2017 | Florentino | G05B 13/041 |
| 2020/0195317 A1* | 6/2020 | Yasukawa | H04B 7/0456 |
| 2021/0258193 A1* | 8/2021 | Li | H04L 25/0228 |

FOREIGN PATENT DOCUMENTS

| | | |
|---|---|---|
| EP | 3213452 A1 | 9/2017 |
| WO | WO 2006035292 A2 | 4/2006 |
| WO | 2016070018 A1 | 5/2016 |
| WO | WO 2017203227 A1 | 11/2017 |

OTHER PUBLICATIONS

Extended European Search Report dated Aug. 26, 2022 for European Patent Application No. 20740996.2, 10 pages.

Arslan, Huseyin et al.; "Delay Spread Estimation for Wireless Communication Systems"; Proceedings of the 8th International Symposium on Computers and Communication (ISCC'03); Jan. 1, 2003; 6 pages.

* cited by examiner

METHOD AND APPARATUS FOR MULTI-PATH DELAY ESTIMATION

CROSS REFERENCE TO RELATED APPLICATIONS

This application is a 35 U.S.C. § 371 national stage application of PCT International Application No. PCT/CN2020/072060 filed on Jan. 14, 2020, which in turns claims foreign priority to PCT International Application No. PCT/CN2019/071601, filed on Jan. 14, 2019, the disclosures and content of which are incorporated by reference herein in their entirety.

FIELD OF THE INVENTION

The present disclosure generally relates to wireless communication technology, and more specifically, to estimation of multi-path delay for a wireless channel in a wireless communication system.

BACKGROUND

This section introduces aspects that may facilitate better understanding of the disclosure. Accordingly, the statements of this section are to be read in this light and are not to be understood as admissions about what is in the prior art or what is not in the prior art.

Channel multi-path delay is a very important parameter in wireless communication. This parameter could be used for estimation of channel coherent bandwidth and channel correlation function in frequency domain. The channel multi-path delay is also widely used in the technology of channel estimation filtering, e.g., Minimum Mean Squared Error (MMSE) channel filtering, averaging channel filtering, interpolation channel filtering etc.

MMSE estimation method is one of preferred approaches for Orthogonal Frequency Division Multiplexing (OFDM) channel estimation. In order to perform MMSE estimation, auto- and cross-covariance matrix and noise power shall be known. However, accurate estimation of correlation values requires averaging over sufficient samples, which is almost impractical in reality. Other methods to obtain correlation values rely on obtaining of multi-path delay $\tau_{max}$ and/or root mean square (RMS) of the multi-path delay $\tau_{rms}$ for the frequency channel correlation. The MMSE $H_{MMSE}$ may be calculated by:

$$H_{MMSE} = R_{HH}\left(R_{HH} + I\frac{\beta}{SINR}\right)^{-1} H_{raw}$$

where $R_{HH}$ is the covariance of a frequency channel, I is an identity matrix, and $\beta$ is a constant which corresponds to a modulation type. For example, for Quad-Phase Shift Key (QPSK), $\beta=1$; for 16 Quadrature Amplitude Modulation (QAM), $\beta=1.8889$; for 64 QAM, $\beta=2.6854$. In addition, SINR means Signal to Interference plus Noise Ratio and $H_{raw}$ is raw channel estimation of the channel in frequency domain. $(.)^{-1}$ means a matrix inverse operation.

In particular, $$R_{HH} = \begin{bmatrix} R_{HH}(0) & R_{HH}(1)^* & \ldots & R_{HH}(N-1)^* \\ R_{HH}(1) & R_{HH}(0) & \ldots & R_{HH}(N-2)^* \\ \vdots & \vdots & \vdots & \vdots \\ R_{HH}(N-1) & R_{HH}(N-2) & \ldots & R_{HH}(0) \end{bmatrix},$$

wherein N is the number of samples in the raw channel estimation, and * means a conjugate operation. Each element of $R_{HH}$ can be obtained by:

$$R_{HH}(n) = \frac{1}{1 + j2\pi n \Delta f \tau_{rms}}$$

if power density function (p.d.f) is $$\theta(\tau) = \frac{\exp\left(-\frac{\tau}{\tau_{rms}}\right)}{\tau_{rms}}$$

and $$\tau \in [0,\infty], \text{ where } n=\text{any of } 0,1,2, \ldots, N-1. \tag{1}$$

The delay spread for multi-path delay is important for it has a significant impact on the Inter Symbol Interference (ISI) of a channel. If a symbol duration is long enough compared to the delay spread, one can expect an equivalent ISI-free channel Its correspondence with the frequency domain is the notion of coherence bandwidth (CB), which is the bandwidth over which the channel can be assumed flat. Coherence bandwidth is related to the inverse of the delay spread. The shorter the delay spread, the larger is the coherence bandwidth.

In the existing technology, the delay spread for multi-path delay is mostly calculated in time domain. Particularly, the impulse response of a time domain channel or power delay profile (PDP) of the channel are obtained first and then the delay spread may be calculated therefrom. In an OFDM system (e.g. an Long Term Evolution (LTE) system, a Worldwide Interoperability for Microwave Access (WiMAX) system), a frequency domain channel response on Cell Reference Signal (CRS)/Demodulation Reference Signal (DMRS) subcarriers shall be obtained first, which then is transformed into time domain to get a time domain channel response or PDP, and then the delay spread can be calculated from that.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As mentioned above, one possible solution for delay spread estimation may be done in time domain. Its accuracy highly relies on the time resolution of channel multi-path. If a channel is wideband, it will have a high multi-path resolution after the channel estimation in frequency domain is transformed into time domain and therefore an accurate estimation may be obtained.

But if a channel is narrowband, it will have a low multi-path resolution. For example, a narrowband channel might become a single path channel after the channel estimation in frequency domain is transformed into time domain, and thus it will be impossible to get an accurate estimation for the delay spread.

In an LTE system, for downlink, CRS is a cell-specific wideband signal on each downlink subframe. Thus, each user equipment (UE) could utilize the CRS signal to get an accurate delay spread estimation. In the LTE system, for uplink, an eNB could use DMRS to estimate the delay spread, where one UE will be scheduled with at least 6 Physical Resource Blocks (PRBs) each having 12 DMRS Resource Elements (REs). So, the eNB could also get a good delay spread estimation for each UE using the UL DMRS REs.

However, in a fifth generation (5G) new radio (NR) system, it might be impossible to get an accurate delay spread using the above solution for the following reasons.

Firstly, 5G NR has removed CRS in $3^{rd}$ generation partnership project (3GPP) Release15. So, a UE may need to use DL DMRS to calculate the delay spread. In addition, 3GPP Release15 introduces a PRB bundling size to define DL precoding granularity, where the DL precoding is done in the unit of PRB bundling size in frequency domain. The PRB bundling size is defined as 2, 4 or wideband. Each PRB building may be pre-coded with different precoding matrices and thus a UE has to do channel estimation within each PRB bundling.

In 3GPP Release 15, for each PRB, only 3 (or 2) DMRS REs for channel estimation can be obtained in frequency domain for DMRS type 1 (or 2). So, if the PRB bundling size is 2 or 4, for each PRB bundling, only 6 (or 4) or 12 (or 8) DMRS REs for channel estimation can be obtained. Thus it is impossible to get an accurate delay spread with the above technology due to the low multi-path resolution.

Secondly, for Massive-Multiple Input Multiple Output (MIMO) in LTE or 5G NR, DL/UL digital beamforming (BF) may be used for DL/UL Multiple User (MU)-MIMO scenarios. The digital beamforming weight may also have sub-band BF weight granularity (e.g. 2 PRB) in order to get better MU-MIMO performance. So in this case, it is also very difficult to estimate the delay spread/multi-path delay with the above technology.

Thirdly, complexity of the above solution is high. The above solution needs Inverse Discrete Fourier Transform (IDFT) to transform the channel estimation on DMRS in frequency domain into time domain, then to reduce noise and select valid multi-paths, finally calculate the delay spread based on the selected multi-paths. The process is highly complicated.

According to various embodiments of the present disclosure, there is provided an improved solution to multi-path delay spread estimation, which could overcome one or more problems as mentioned above.

According to the first aspect of the present disclosure, there is provided a method performed by a communication device, which may be a terminal device or a network device. The method may comprise obtaining, in frequency domain, channel estimation for a transmission unit for a channel between the communication device and another communication device, which may correspondingly be a network device or a terminal device. The method may also comprise calculating correlation coefficients for the transmission unit based on the channel estimation and obtaining a delay spread/multi-path delay for the channel from the calculated correlation coefficients.

In an embodiment of the present disclosure, obtaining the delay spread may further comprise calculating a correlation ratio from the correlation coefficients, comparing the correlation ratio with a predetermined value, which may be stored in a table, and obtaining the delay spread based on the comparison.

In another embodiment of the present disclosure, calculating the correlation coefficients may further comprise calculating the correlation coefficients for one or more frequency bands respectively and averaging the correlation coefficients over the one or more frequency bands.

In yet another embodiment of the present disclosure, the transmission unit may comprise one or more DMRS symbols. In the embodiment that the transmission unit comprises two or more DMRS symbols, obtaining the channel estimation may further comprise obtaining the channel estimation for each of the two or more DMRS symbols respectively and calculating the correlation coefficients further comprises calculating correlation coefficients for each of the two or more DMRS symbols respectively and then averaging the correlation coefficients over the two or more DMRS symbols.

According to a second aspect of the present disclosure, there is provided a communication device. The communication device may comprise a processor and a memory. The memory may contain instructions executable by the processor whereby the communication device may be operative to obtain, in frequency domain, channel estimation for a transmission unit for a channel between the communication device and another communication device, to calculate correlation coefficients for the transmission unit based on the channel estimation and to obtain a delay spread for the channel from the calculated correlation coefficients.

In an embodiment of the present disclosure, the delay spread may be obtained by calculating a correlation ratio from the correlation coefficients, comparing the correlation ratio with a predetermined value and obtaining the delay spread based on the comparison.

In yet another embodiment of the present disclosure, the correlation coefficients may be calculated by calculating the correlation coefficients for one or more frequency bands respectively and then averaging the correlation coefficients over the one or more frequency bands.

In yet another embodiment of the present disclosure, the transmission unit may comprise one or two DMRS symbols. In the embodiment of the present disclosure that the transmission unit comprises two or more DMRS symbols, obtaining the channel estimation may further comprise obtaining the channel estimation for each of the two or more DMRS symbols respectively and calculating the correlation coefficients may further comprise calculating correlation coefficients for each of the two or more DMRS symbols respectively and averaging the correlation coefficients over the two or more DMRS symbols.

According to a third aspect of the present disclosure, there is provided a computer-readable medium having instructions stored thereon. The instructions, when executed on at least one processor, may cause the at least one processor to carry out the method according to the first aspect of the present disclosure.

According to various embodiments of the present disclosure, one or more advantages can be achieved, for example, a good performance for delay spread estimation can be obtained for such as narrowband scenarios. Furthermore, compared with the existing technology, low complexity for the delay spread estimation can be achieved, without a need for transforming a channel from frequency domain into time domain.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
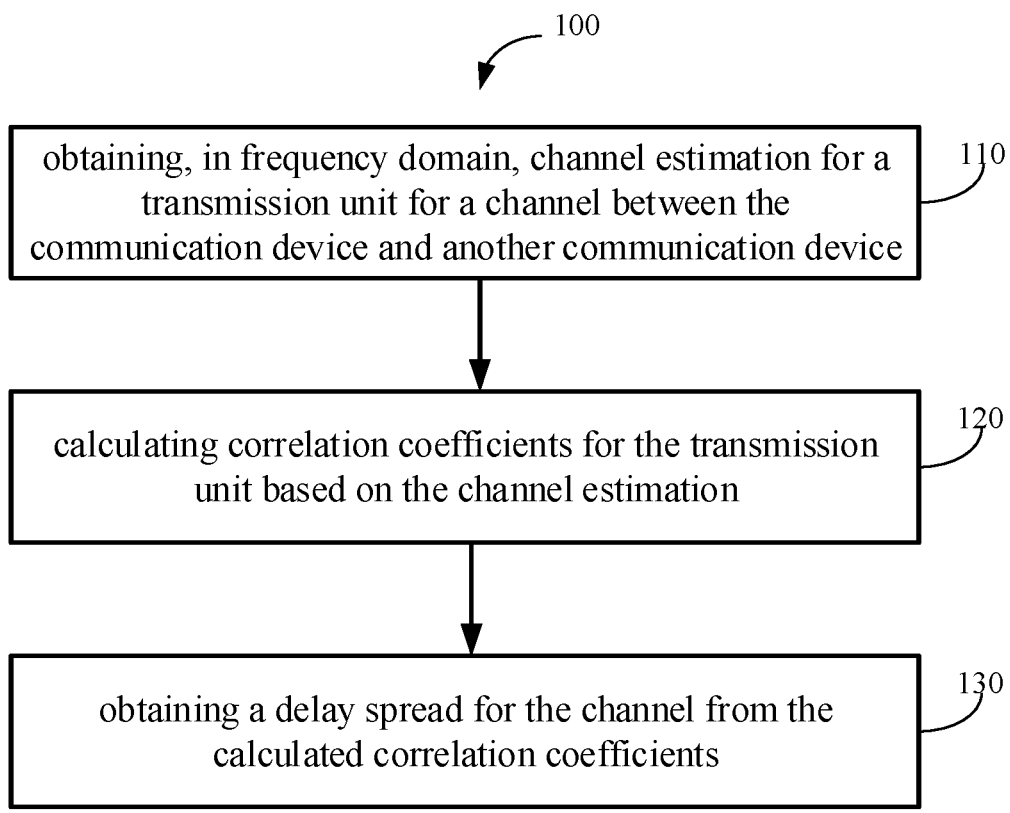
FIG. 1 illustrates a flowchart for a method 100 performed by a communication device according to embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitation on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node/device in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node", and or "network device" refers to any node/device in a communication network via which a terminal device accesses to the network and receives services therefrom. The network node or network device may refer to a base station (BS), an access point (AP), a multi-cell/multicast coordination entity (MCE), a controller, a station (STA) or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node/device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node/device may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaining terminal devices, music storage and playback appliances, a mobile phone, a cellular phone, a smart phone, a tablet, a wearable device, a personal digital assistant (PDA), a vehicle, and the like.

The term "communication device" may refer to either a "terminal device" or a "network device".

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In the following, various embodiments of the present disclosure will be described with reference to the accompany figures.

FIG. 1 illustrates a flowchart for a method 100 performed by a communication device according to embodiments of the present disclosure.

The method starts at block 110, where the communication device obtains in frequency domain, channel estimation for a transmission unit for a channel between the communication device and another communication device.

In some embodiments, the transmission unit may comprise a Demodulation Reference Signal (DMRS) symbol. In the embodiment where the communication device is a terminal device, e.g. a UE, while the another communication device is a network device, e.g. an eNB or gNB, the DMRS is a DL DMRS. In the embodiment where the communication device is a network device, e.g. an eNB or gNB, while the another communication device is a terminal device, e.g. a UE, the DMRS is an UL DMRS.

In particular, the communication device may perform Least Square (LS) channel estimation on the received DMRS(s) to obtain raw frequency channel estimation result $H_{raw}$, i.e. $H_{raw}(k) = Y_{DMRS}(k)/X_{DMRS}(k)$, where $Y_{DMRS}$ is the received DMRS in frequency domain; $X_{DMRS}$ is the transmitted DMRS in frequency domain, k refers to a sample index.

Then in block 120, the communication device calculates correlation coefficients for the transmission unit based on the channel estimation, e.g. $H_{raw}$.

In an embodiment where the transmission unit comprises one DMRS symbol, the communication device receiving the DMRS symbol may calculate the channel correlation coefficients for given points ($\Delta f$), e.g. $\hat{R}_H(\Delta f)$ of $\Delta f=1, 2, 3$, for the DMRS symbol, where $\Delta f=1$ represents a minimum frequency distance of input samples for the channel estimation, $\Delta f=2$ represents 2 times of the minimum frequency distance, and $\Delta f=3$ represents 3 times of the minimum frequency distance.

In particular, the calculation of correlation coefficients is based on raw frequency channel estimation $H_{raw}$ for the DMRS symbol. As an example, if the whole bandwidth of the channel comprises one or more narrow bands (e.g. each narrow band having 2RBs), and there are 2*3=6 samples for channel estimation per narrowband per DMRS symbol, let b represent a narrowband index, then the correlation coefficients $\hat{R}_{H,b}(\Delta f)$ for this narrowband can be calculated as $$\hat{R}_{H,b}(\Delta f) = E[H_{raw}(k)H_{raw}^*(k+\Delta f)] = \frac{1}{N}\sum_k H_{raw}(k)H_{raw}^*(k+\Delta f) \quad (2)$$

where k refers to the sample index and N is the total number of valid k with k satisfying $0 \leq k \leq 5$ and $0 \leq k+\Delta f \leq 5$. Thus, when $\Delta f=1$, then k=0, 1, 2, 3, 4 and N=5; when $\Delta f=2$, then k=0, 1, 2, 3 and N=4; when $\Delta f=3$, then k=0, 1, 2 and N=3. Please note that, the total sample number for channel estimation per narrowband per DMRS symbol is calculated as $N_b = N_{RB}^{scg} \cdot N_{dmrs}^{RB}$, where $N_{RB}^{scg}$ is the number of RBs per narrowband, such as "2" as described above, and $N_{dmrs}^{RB}$ is the number of DMRS samples per RB per DMRS symbol, such as "3" as described above. Further, E[.] means average operation.

Further, for convenience of calculation and comparison, absolute values may be utilized. Namely, $$\hat{R}_{H,b}(\Delta f) = |E[H_{raw}(k)H_{raw}^*(k+\Delta f)]| = \left|\frac{1}{N}\sum_k H_{raw}(k)H_{raw}^*(k+\Delta f)\right|,$$

where |.| means an absolute value operation.

In an embodiment where the whole bandwidth comprises several narrow bands, the communication device may average the channel correlation coefficients $\hat{R}_{H,b}(\Delta f)$ over all the narrow bands. That is, $$\hat{R}_H(\Delta f) = \frac{1}{M}\sum_{b=0}^{M-1}\hat{R}_{H,b}(\Delta f),$$

where M is the total number of the narrow bands.

In an embodiment where the transmission unit comprises two or more DMRS symbols, the communication device may calculate the channel correlation coefficients for each DMRS symbol and then average the channel correlation coefficients over all of the two or more DMRS symbols.

Then in block 130, the communication device obtains a delay spread/multi-path delay for the channel from the calculated correlation coefficients.

In an embodiment, the communication device may obtain the delay spread by calculating a correlation ratio of the correlation coefficients, comparing the correlation ratio with a predetermined value, which may be stored in a table, and then obtaining the delay spread based on the comparison.

In an example where the correlation coefficients (which may be the averaged correlation coefficients) are calculated e.g. for three given points, i.e. $\Delta f=(1,2,3)$, as $\hat{R}_H(1)$, $\hat{R}_H(2)$, and $\hat{R}_H(3)$, the communication device may calculate the correlation ratios of $$\frac{\hat{R}_H(3)}{\hat{R}_H(1)} \text{ and } \frac{\hat{R}_H(2)}{\hat{R}_H(1)},$$

and then compare the calculated correlation ratios with some predetermined values. The predetermined values are calculated according to the existing theory or experience and stored in the form of a table.

For example, the predetermined values can be obtained by the following approach. Firstly, the correlation coefficients are calculated for different possible multi-path delays. Taking the three-dimensional MIMO channel defined in 3GPP 36.873 V12.7.0 as an example, three different multi-path time delays $(\tau_{max}, \tau_{rms})=(0.1 \text{ µs}, 0.03 \text{ µs}), (1.03 \text{ µs}, 0.32 \text{ µs}), (5.15 \text{ µs}, 0.92 \text{ µs})$ can be used to calculate the correlation coefficients $R_f(\Delta f)$ (a correlation function of $\Delta f$, which is the distance between two frequency domain samplings) (representing any of $\tilde{R}_H(1)$, $\tilde{R}_H(2)$ and $\tilde{R}_H(3)$) according to, but not limited to:

$$R_f(\Delta f) = \frac{1-\exp\left(-\tau_{max}\left(\frac{1}{\tau_{rms}}+j2\pi\Delta f\right)\right)}{\left(1-\exp\left(-\frac{\tau_{max}}{\tau_{rms}}\right)\right)(1+j2\pi\Delta f\tau_{rms})}$$

if p.d.f is $$\theta(\tau) = \frac{\exp\left(-\frac{\tau}{\tau_{rms}}\right)}{\tau_{rms}\left(1-\exp\left(-\frac{L}{\tau_{rms}}\right)\right)}$$

and $$\tau \in [0,L], \quad (2)$$

wherein L is the maximum delay. Then, for example, the correlation ratios of $$\frac{\tilde{R}_H(3)}{\tilde{R}_H(1)} \text{ and } \frac{\tilde{R}_H(2)}{\tilde{R}_H(1)}$$

can be calculated and stored in a table as predetermined values.

Figure 2:
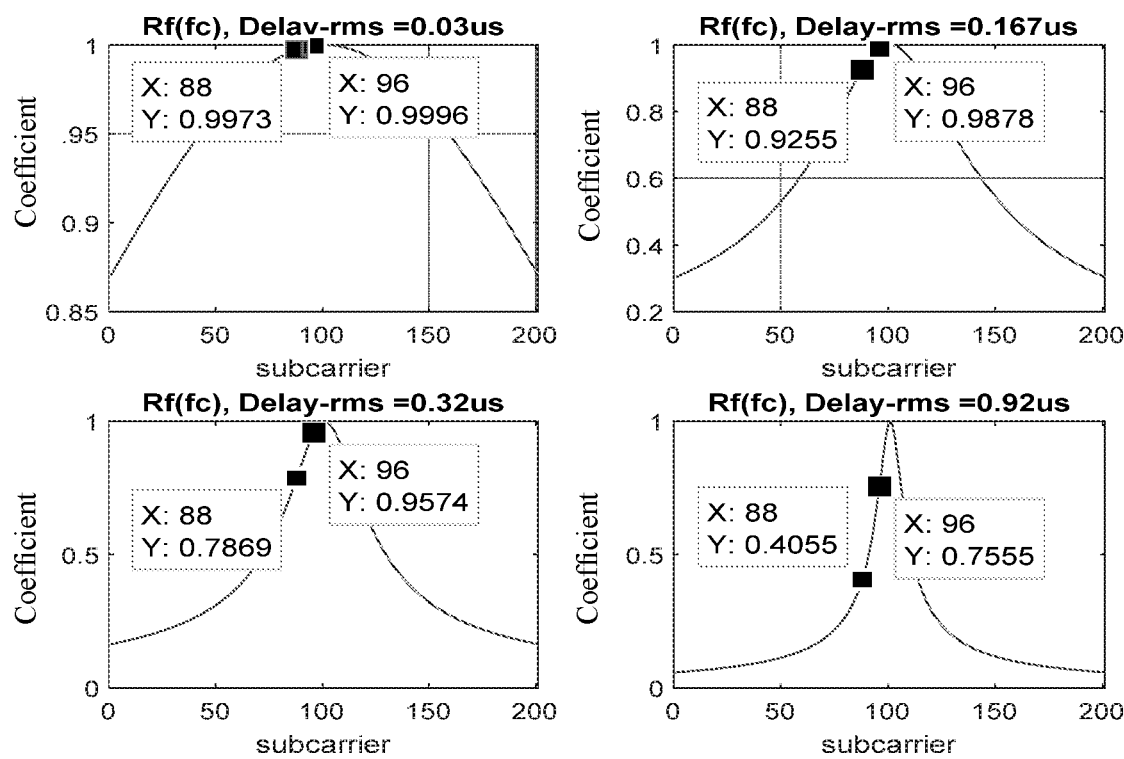
FIG. 2 illustrates an illustrative example of theoretical correlation coefficients calculated for four multi-path time delays.

FIG. 2 illustrates an example of theoretical correlation coefficients calculated for four multi-path time delays, i.e. $(\tau_{max}, \tau_{rms})=(0.1 \text{ µs}, 0.03 \text{ µs}), (0.51 \text{ µs}, 0.167 \text{ µs}), (1.03 \text{ µs}, 0.32 \text{ µs})$ and $(5.15 \text{ µs}, 0.92 \text{ µs})$. In FIG. 2, the horizontal axis represents subcarriers and the vertical axis represents correlation coefficients. As shown, the correlation coefficient for the central subcarrier 100 is 1. The two black squares in each sub-figure of FIG. 2 show the theoretical correlation coefficients $\tilde{R}_H(1), \tilde{R}_H(3)$ for two given points i.e. $\Delta f=1$ (one time of the DMRS subcarrier interval (i.e. 4 subcarriers)) and $\Delta f=3$ (three times of the DMRS subcarrier interval (i.e. 12 subcarriers)), respectively. For ease of illustration rather than limitation, only two points are used herein. Based on this figure, the theoretical $$\frac{\tilde{R}_H(3)}{\tilde{R}_H(1)}$$

can be calculated and prestored.

For example, if the measured ratio $$\frac{\hat{R}_H(3)}{\hat{R}_H(1)}$$

is smaller than the theoretical ratio $$\frac{\tilde{R}_H(3)}{\tilde{R}_H(1)}$$

when $\tau_{rms}=0.03$ μs, then the multi-path delay may be estimated as $\tau_{rms}=0.03$ μs; otherwise, if the measured ratio $$\frac{\hat{R}_H(3)}{\hat{R}_H(1)}$$

is smaller than the theoretical ratio $$\frac{\tilde{R}_H(3)}{\tilde{R}_H(1)}$$

when $\tau_{rms}=0.167$ μs, then the multi-path delay may be estimated as $\tau_{rms}=0.167$ μs; otherwise, if the measured ratio $$\frac{\hat{R}_H(3)}{\hat{R}_H(1)}$$

is smaller than the theoretical ratio $$\frac{\tilde{R}_H(3)}{\tilde{R}_H(1)}$$

when $\tau_{rms}=0.32$ μs, then the multi-path delay may be estimated as $\tau_{rms}=0.32$ μs; otherwise, the multi-path delay may be estimated as $\tau_{rms}=0.92$ μs.

Correspondingly, $\tau_{max}$ may be selected from the same set $(\tau_{max}, \tau_{rms})$ as $\tau_{rms}$.

If the correlation coefficients are available for more points and more than one correlation ratios may be calculated, then more than one multi-path delays $\tau_{rms,1}$ $\tau_{rms,2}$ . . . may be obtained based on the above method. Then the maximum value can be chosen as the final delay spread, i.e. $\tau_{rms}=\max(\tau_{rms,1}, \tau_{rms,2}, \ldots)$.

In another example, the communication device can calculate correlation ratios of $$\frac{\hat{R}_H(3) - \hat{R}_H(1)}{\hat{R}_H(1)} \text{ and } \frac{\hat{R}_H(2) - \hat{R}_H(1)}{\hat{R}_H(1)}$$

after obtaining correlation coefficients $\hat{R}_H(1)$, $\hat{R}_H(2)$, and $\hat{R}_H(3)$ as above, and then compare such ratios with the predetermined values which may be calculated according to the existing theory or experience and stored in a table. For example, according to equation (2), theoretical correlation coefficients $\tilde{R}_H(1)$, $\tilde{R}_H(2)$ and $\tilde{R}_H(3)$ can be calculated and then $$\frac{\tilde{R}_H(3) - \tilde{R}_H(1)}{\tilde{R}_H(1)} \text{ and } \frac{\tilde{R}_H(2) - \tilde{R}_H(1)}{\tilde{R}_H(1)}$$

can be obtained and stored. Based on the comparison, multi-path delays $(\tau_{max,1}, T_{rms,1})$ and $(\tau_{max,2}, T_{rms,2})$ are obtained. Then the maximum value can be chosen as the final delay spread, i.e. $\tau_{rms}=\max(\tau_{rms,1}, \tau_{rms,2})$, and $\tau_{max}$ may be selected from the same set as $\tau_{rms}$.

In a further example, the communication device can calculate correlation ratio of $$\frac{\hat{R}_H(3) + \hat{R}_H(1)}{2\hat{R}_H(1)} \text{ and } \frac{\hat{R}_H(2) + \hat{R}_H(1)}{2\hat{R}_H(1)}$$

after obtaining correlation coefficients $\hat{R}_H(1)$, $\hat{R}_H(2)$, and $\hat{R}_H(3)$, and compare such ratios with the predetermined values which may be calculated according to the existing theory or experience and stored. For example, according to equation (2), theoretical correlation coefficients $\tilde{R}_H(1)$, $\tilde{R}_H(2)$ and $\tilde{R}_H(3)$ can be calculated and then $$\frac{\tilde{R}_H(3) + \tilde{R}_H(1)}{2\tilde{R}_H(1)} \text{ and } \frac{\tilde{R}_H(2) + \tilde{R}_H(1)}{2\tilde{R}_H(1)}$$

can be obtained and stored. Based on the comparison, multi-path delays $(\tau_{max,1}, \tau_{rms,1})$ and $(\tau_{max,2}, \tau_{rms,2})$ are obtained. Then the maximum value can be chosen as the final delay spread, $\tau_{rms}=\max(\tau_{rms,1}, \tau_{rms,2})$, and $\tau_{max}$ may be selected from the same set as $\tau_{rms}$.

Please note that depending on different implementation, the number of points for which the correlation coefficients are calculated may be more or less than three. Two or more points are all feasible. However, use of the relatively less points may reduce complexity. In addition, with more points being used for calculation of correlation coefficients more correlation ratios may be calculated (also depending on implementation). Accordingly, more multi-path delays can be obtained for the delay spread estimation, and thus the accuracy may be improved.

In some embodiments, in order to enhance robustness and performance, more than two property values, e.g. two types of ratios, can be calculated and compared to the predetermined values.

Generally, all valid values of $\hat{R}_H(\Delta f)$ can be used to extract the characteristic of the theoretical frequency channel correlation function, including but not limited to slope, gradient, and reciprocal. Then the extracted characteristic can be compared with theoretical predetermined values for different time delays to obtain the actual time delay (e.g. the delay spread and/or the maximum delay).

Please note that the description of the above embodiments in relation to 5G NR is shown as an example. The concept and idea of the present disclosure can be more generally applied to other communication systems.

Figure 3:
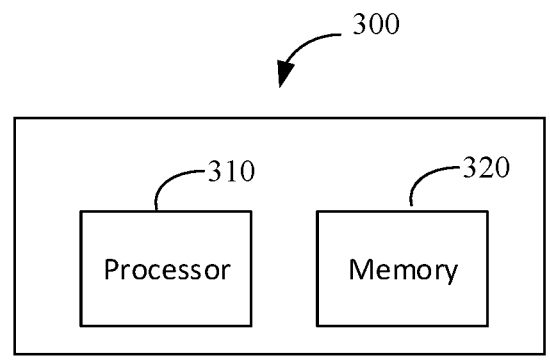
FIG. 3 illustrates a communication device 300 according to embodiments of the present disclosure.

FIG. 3 illustrates a communication device 300 according to embodiments of the present disclosure. The communication device 300 may be a terminal device or a network device.

As illustrated, the communication device 300 comprises a processor 310 and a memory 320. The memory 320 contains instructions executable by the processor 310 whereby the communication device is operative to perform the method as described above in reference to FIG. 1.

In particular, the memory 320 contains instructions executable by the processor 310 whereby the communication device is operative to obtain, in frequency domain, channel estimation for a transmission unit for a channel between the communication device and another communication device, to calculate correlation coefficients for the transmission unit based on the channel estimation and to obtain a multi-path delay for the channel from the calculated correlation coefficients.

In an embodiment of the present disclosure, the multi-path delay may be obtained by calculating a correlation ratio from the correlation coefficients, comparing the correlation ratio with a predetermined value, which may be stored in a table, and then obtaining the delay spread based on the comparison.

In a further embodiment, the correlation coefficients may be calculated by calculating the correlation coefficients for one or more frequency bands respectively and averaging the correlation coefficients over the one or more frequency bands.

In a further embodiment, the transmission unit may comprise one or more DMRS symbols. In the embodiment that the transmission unit comprises two or more DMRS symbols, the communication device 300 may obtain the channel estimation for each of the two or more DMRS symbols respectively and then calculate correlation coefficients for each of the two or more DMRS symbols respectively and average the correlation coefficients over the two or more DMRS symbols.

Other embodiments of the present disclosure provide a computer-readable medium having instructions stored thereon. The instructions, when executed on at least one processor, cause the at least one processor to carry out the method as described above in reference to FIG. 1

Figure 4:
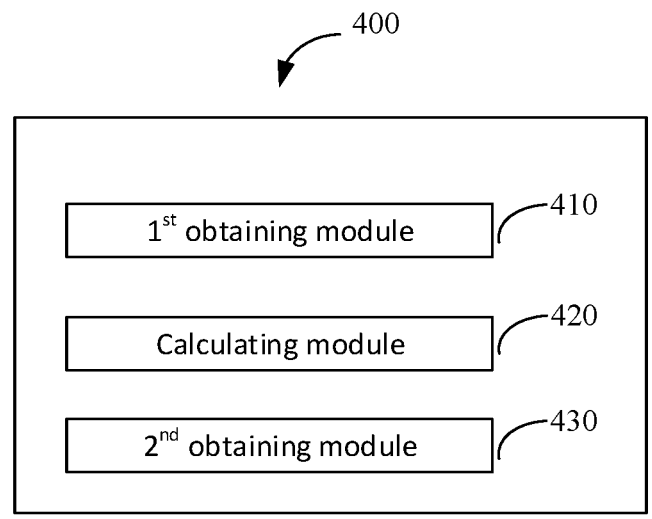
FIG. 4 illustrates a communication device 400 according to embodiments of the present disclosure.

FIG. 4 illustrates a communication device 400 according to embodiments of the present disclosure. The communication device 400 may be a terminal device or a network device.

As illustrated, the communication device 400 comprises a first obtaining module 410, a calculating module 420 and a second obtaining module 430. The first obtaining module 410 is configured to obtain, in frequency domain, channel estimation for a transmission unit for a channel between the communication device and another communication device. The calculating module 420 is configured to calculate correlation coefficients for the transmission unit based on the channel estimation. The second obtaining module 430 is configured to obtain a delay spread for the channel from the calculated correlation coefficients. The first obtaining module 410, the calculating module 420 and the second obtaining module 430 may be further configured to operate in accordance with the method as described with reference to FIG. 1.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable/readable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a communication device, comprising:
    obtaining, in frequency domain, channel estimation for a transmission unit for a channel between the communication device and another communication device;
    calculating correlation coefficients for the transmission unit based on the channel estimation; and
    obtaining a delay spread for the channel from the calculated correlation coefficients,
    wherein obtaining the delay spread further comprises:
        calculating a correlation ratio from the correlation coefficients;
        comparing the correlation ratio with a predetermined value; and
        obtaining the delay spread based on the comparison.

2. The method according to claim 1, wherein calculating the correlation coefficients comprises:
calculating the correlation coefficients for one or more frequency bands respectively; and
averaging the correlation coefficients over the one or more frequency bands.

3. The method according to claim 1, wherein
the transmission unit comprises a Demodulation Reference Signal, DMRS, symbol.

4. The method according to claim 1, wherein
the transmission unit comprises two or more Demodulation Reference Signal, DMRS, symbols;
obtaining the channel estimation further comprises obtaining the channel estimation for each of the two or more DMRS symbols respectively; and
calculating the correlation coefficients further comprises calculating correlation coefficients for each of the two or more DMRS symbols respectively and averaging the correlation coefficients over the two or more DMRS symbols.

5. The method according to claim 1, wherein the predetermined value is stored in a table.

6. The method according to claim 1, wherein
the communication device is a terminal device and the another communication device is a network device; or
the communication device is a network device and the another communication device is a terminal device.

7. A communication device, comprising:
a processor and a memory, said memory containing instructions executable by said processor whereby said communication device is operative to:
obtain, in frequency domain, channel estimation for a transmission unit for a channel between the communication device and another communication device;
calculate correlation coefficients for the transmission unit based on the channel estimation; and
obtain a delay spread for the channel from the calculated correlation coefficients,
wherein the delay spread is obtained by:
calculating a correlation ratio from the correlation coefficients;
comparing the correlation ratio with a predetermined value; and
obtaining the delay spread based on the comparison.

8. The communication device according to claim 7, wherein the correlation coefficients are calculated by:
calculating the correlation coefficients for one or more frequency bands respectively; and
averaging the correlation coefficients over the one or more frequency bands.

9. The communication device according to claim 7, wherein
the transmission unit comprises a Demodulation Reference Signal, DMRS, symbol.

10. The communication device according to claim 7, wherein
the transmission unit comprises two or more Demodulation Reference Signal, DMRS, symbols;
obtaining the channel estimation further comprises obtaining the channel estimation for each of the two or more DMRS symbols respectively; and
calculating the correlation coefficients further comprises calculating correlation coefficients for each of the two or more DMRS symbols respectively and averaging the correlation coefficients over the two or more DMRS symbols.

11. The communication device according to claim 7, wherein the predetermined value is stored in a table.

12. A method performed by a communication device, comprising:
obtaining, in frequency domain, channel estimation for a transmission unit for a channel between the communication device and another communication device;
calculating correlation coefficients for the transmission unit based on the channel estimation, wherein calculating the correlation coefficients comprises calculating the correlation coefficients for one or more frequency bands respectively and averaging the correlation coefficients over the one or more frequency bands; and
obtaining a delay spread for the channel from the calculated correlation coefficients.

13. A communication device, comprising:
a processor and a memory, said memory containing instructions executable by said processor whereby said communication device is operative to:
obtain, in frequency domain, channel estimation for a transmission unit for a channel between the communication device and another communication device;
calculate correlation coefficients for the transmission unit based on the channel estimation, wherein the correlation coefficients are calculated by calculating the correlation coefficients for one or more frequency bands respectively and averaging the correlation coefficients over the one or more frequency bands; and
obtain a delay spread for the channel from the calculated correlation coefficients.

* * * * *